Feb. 16, 1971  A. RAK  3,563,642
PROJECTION SYSTEM
Filed Aug. 28, 1967  3 Sheets-Sheet 1
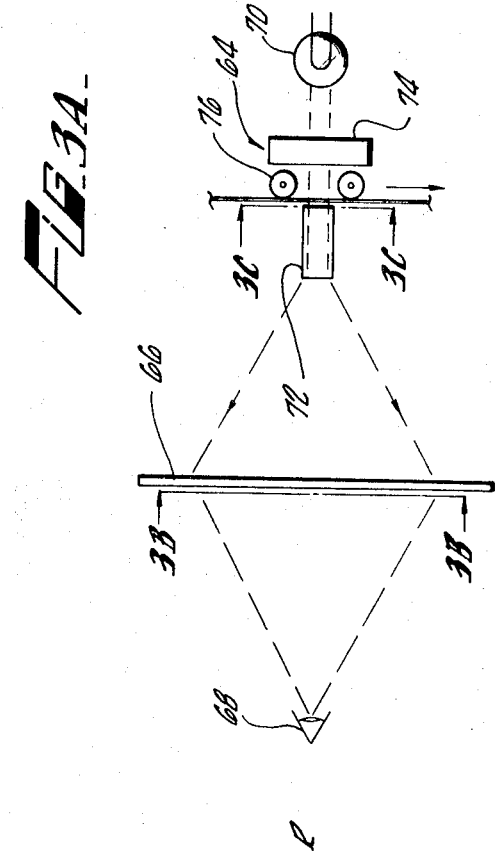
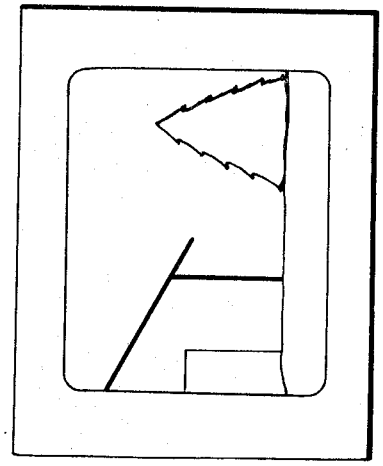
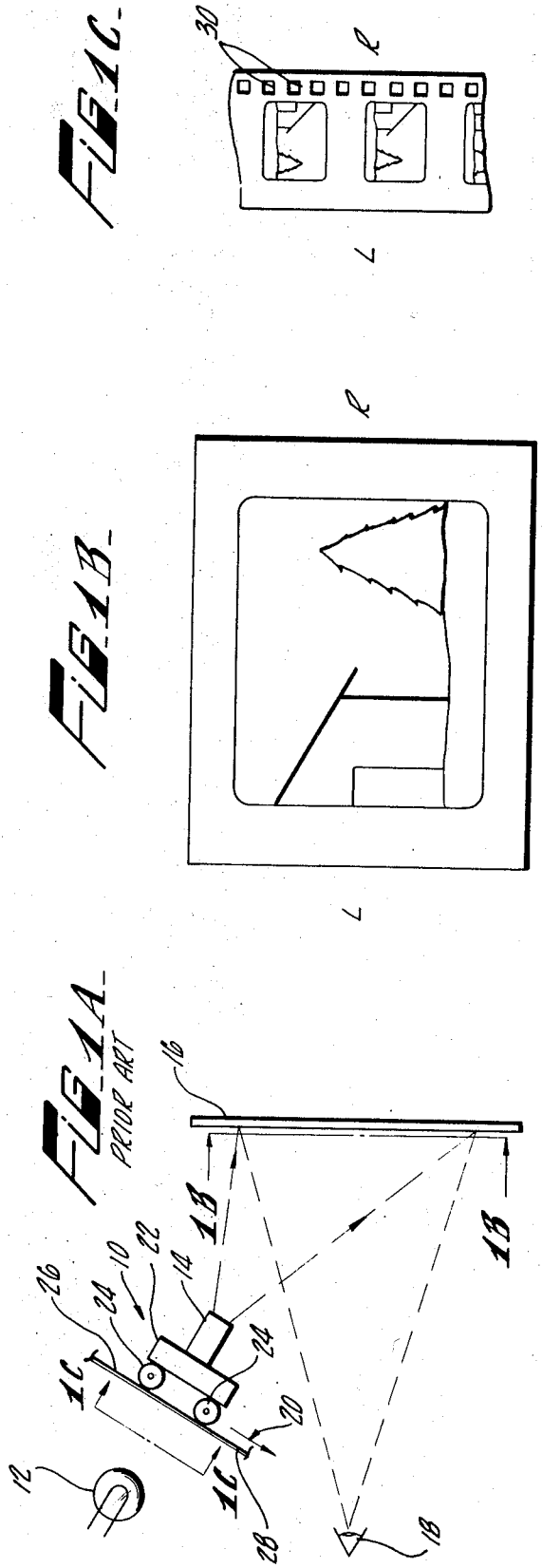
INVENTOR.
ARTHUR RAK
BY
Christie, Parker & Hale
ATTORNEYS Feb. 16, 1971          A. RAK          3,563,642
PROJECTION SYSTEM
Filed Aug. 28, 1967          3 Sheets-Sheet 2
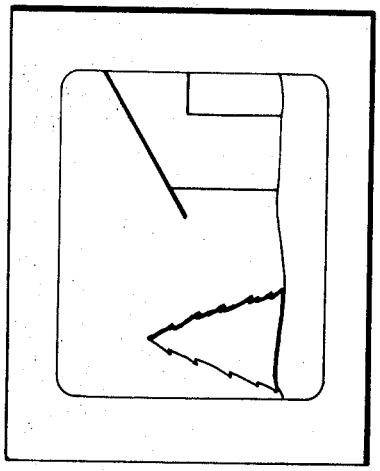
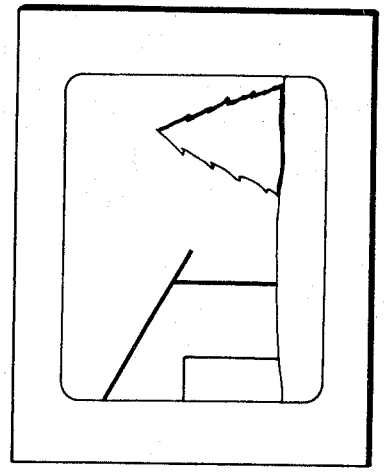
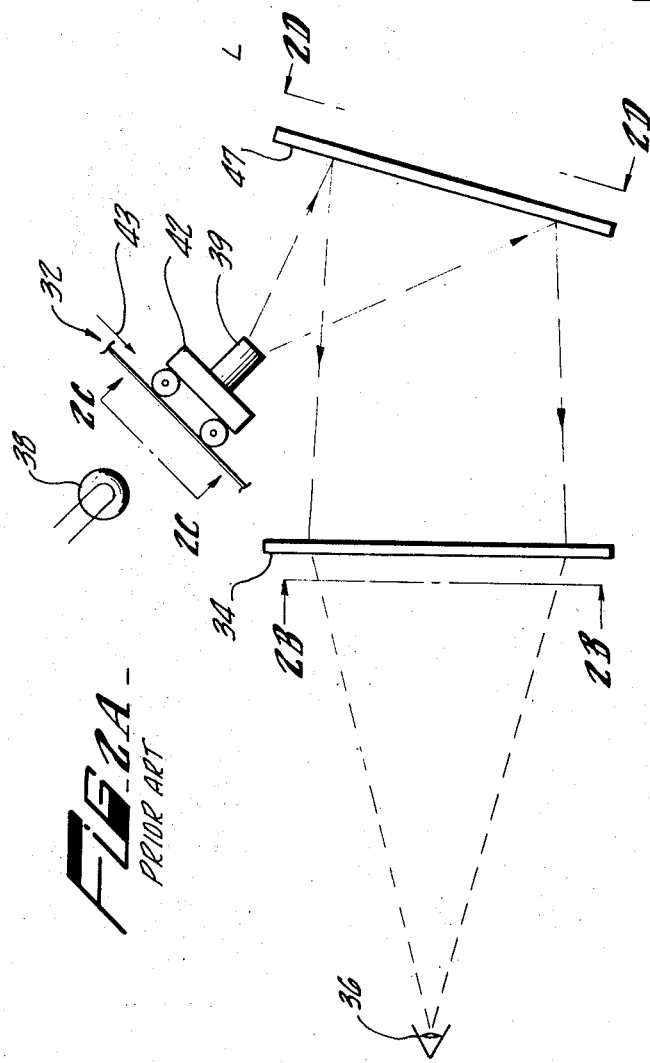
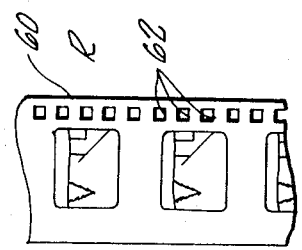
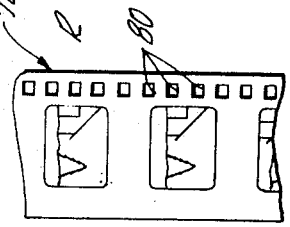
INVENTOR
ARTHUR RAK
BY Christie, Parker & Hale
ATTORNEYS

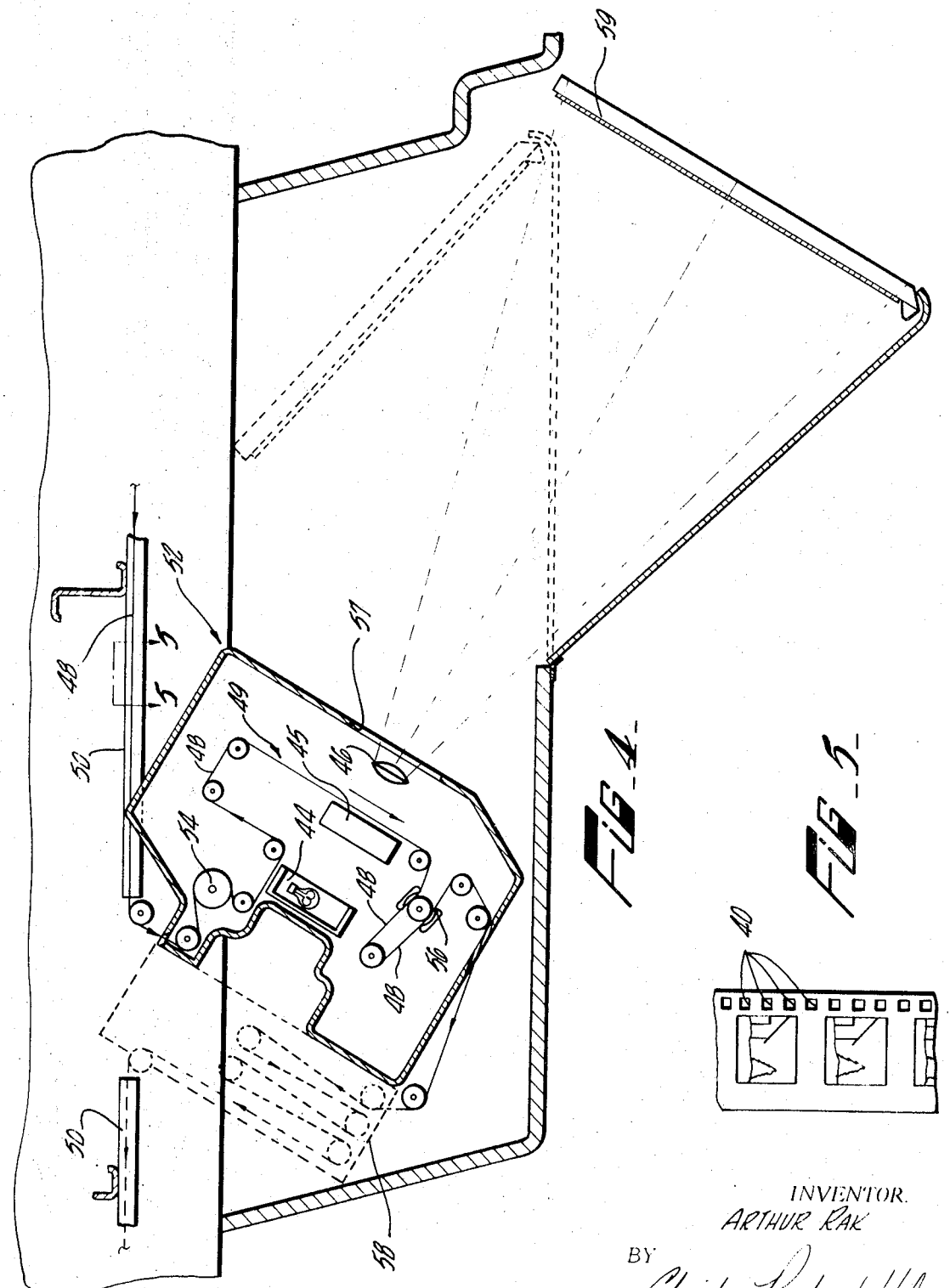

3,563,642
PROJECTION SYSTEM

Arthur Rak, Altadena, Calif., assignor, by mesne assignments, to Bell & Howell Company, Chicago, Ill., a corporation of Illinois
Filed Aug. 28, 1967, Ser. No. 663,873
Int. Cl. G03b 21/10, 21/43
U.S. Cl. 352—40       13 Claims

ABSTRACT OF THE DISCLOSURE

A projection system for use in presenting backlighted projections. In this system a motion picture projector equipped with a conventional right-hand sprocket drive engages a motion picture film along the sprocket holes provided on the right-hand edge of the film, but differs from other projection systems in that the physical locations of the lens and light source in the projector are reversed. With this arrangement light from the source is directed at and through the film from the film side normally adjacent the lens and exits through an aperture provided in the rear of the projector. Illumination emanating from the projector is then directed onto the backlighted screen without the interposition of any optical or reflective elements.

BACKGROUND OF THE INVENTION

The present invention relates to motion picture projection apparatus and in particular to a conventional projector especially adapted for use in a backlighted projection system.

Motion picture projections are typically displayed in one of two ways. In the first, designated a front projection system, a reflective screen is used and the motion picture projector is located on the audience side of the screen. Projections of this type normally require a darkened enclosure because of the relatively long throw from the projector to the screen. There are instances, however, when it is desired to present a motion picture projector under ambient room lighting conditions. While it is possible to make such a presentation with a reflective screen-front projection arrangement, a projection system utilizing a translucent backlighted screen having a relatively short throw has been found to be more effective. This is the second typical type of display, a rear or backlighted projection system. With this type of system light from a conventional source illuminates the screen with sufficient intensity to be viewed on the opposite side of the screen without the necessity of darkening the enclosure surrounding the viewers.

As referred to herein, the term conventional motion picture projector apparatus designates an apparatus in which a projection lamp is located on the side of a motion picture film opposite a projector gating or shuttle mechanism and a projector lens is located on the side of the strip adjacent the mechanism. In such a configuration the teeth of the projector sprocket drive engage the film strip along the right-hand edge of the film when the film is viewed from the projection lamp side thereof. Film properly threaded into such an apparatus is oriented so as to provide what will be referred to as a conventional front-lighted screen projection. The right-left relation of the elements pictured in each frame of the film and in the image projected on a projection screen is referred to as the "handing" of the image.

In a conventional projector, the optics of the lens system used produces an inversion of the image on the film, i.e., the image projected on the screen is the image on the film after a rotation of 180° about the lens axis. To produce a "right reading" image on a front lighted screen, i.e., one in which the image is correctly oriented in the vertical plane and has the proper handing, the film is driven through the conventional projector in a manner such that the projection lamp "sees" an image on the film which is upside down and backwards. Film having its frames arranged so as to be properly oriented when threaded into and then projected by a conventional projector onto a front lighted screen will be referred to herein as a conventional or standard motion picture film, a film having its images conventionally oriented and handed.

In order to produce a "right reading" image in a backlighted system with a conventional projector apparatus, one of several steps is taken. In one approach film printing is altered so that an image of opposite handing from the conventional handing is printed on the motion picture film. In another a reflector is interposed between the projector and the backlighted screen in order to obtain the proper handing. Still another alternative is to reverse the film facewise about the longitudinal axis of the film. This last alternative requires that special modification be made to the motion picture projector in order to drive the film through the projector since in this instance, the sprocket holes of the film are now located on the left side of the film when viewed from the projection lamp side of the film. This repositioning of the sprocket holes in the film to the left side requires substitution of a sprocket drive wheel having teeth on the left side of the wheel in order to engage the now reversed film.

SUMMARY OF THE INVENTION

The present invention provides a motion picture projector comprising a housing and a gating or as shutter mechanism located within the housing for passing light from a source through a motion picture film frame. A typical gating mechanism is the rotary disc shutter illustrated in "The Way Things Work," An Illustrated Encyclopedia of Technology, 1963, Simon and Schuster, pages 190, 191. A film path through the housing is provided, the path extending past the gating mechanism with a side adjacent the mechanism and a side opposite the mechanism. A projection light source is located on the side of the film path adjacent the mechanism to receive and transmit illumination from the source. Means for passing illumination from the housing directly to a backlighted screen is also provided.

The invention also contemplates a method for projecting right reading images recorded on a motion picture film onto a backlighted screen with a conventional motion picture projector apparatus having a projector light source, a light gating mechanism, a projection lens and a film path through the projector having a side adjacent the gating mechanism and a side opposite the gating mechanism. The method comprises the steps of locating the projection lamp on the side of the film path adjacent the mechanism and the projection lens on the side of the film path opposite the gating mechanism. Motion picture film is then threaded into the projector along the film path in an orientation for providing a conventional front-lighted projection and information recorded on the film is projected from the rear of the projector directly onto the back-lighted projection screen.

The present invention provides a new approach to the presentation of backlighted projections. With this approach a conventional motion picture projector is rearranged such that the physical location of the projector light source and the projection lens are reversed relative to the film. Reversal of the position of these two elements of a motion picture projector means that the images on the film are now projected through what is normally the rear of the projector. An aperture is provided at the rear of the projector to pass these conventional radiations from the interior thereof toward a backlighted screen. By the present method of projection the image on the film can now be projected directly onto a back-lighted screen without being handed or folded in way by the interposition of reflective or optical means in the path between the projection lens and the backlighted screen. The result is an image of excellent definition and resolution when compared to backlighted projections in any of the preceding embodiments.

A particular advantage of the present invention is that it makes possible the application of conventional motion picture projector apparatus to both front and backlighted projection systems without the necessity of modifying the gating mechanism, sprocket drive and film path of such apparatus while at the same time improving the qualtity of the backlighted presentations. Substantial economies in terms of projector apparatus production cost can be achieved by virtue of being able to use the same components, particularly the same film drive mechanism, in both systems with the only modification necessary being a reversal of the position of lens and light source relative to the gating mechanism. To achieve the same qualtiy of presentation with prior art projection systems would impose a requirement of a left hand sprocket drive and specially prepared film with sprocket holes located along the opposite edge or specially printed film.

Improvement in the quality of the backlighted projections is achieved by elimination of optical elements, typically a mirror in the projection path to obtain proper handling of the projected image. In high production, low cost projection systems, the qualtiy of the projection image can be substantially enhanced if the number of intermediate optical elements between projection lens and screen is reduced to a minimum. By eliminating the need for a mirror because a reversal of the handling of the image is not necessary with the arrangement of the present invention, the number of intermediate optical elements is reduced to zero with commensurate improvement in terms of projected image resolution and brightness.

DESCRIPTION OF THE DRAWINGS

The invention will be better understood by reference to the following figures wherein:

FIG. 1A is a schematic illustration of a typical prior art projection system for projecting right reading images onto a front-lighted screen;

FIG. 1B is a view taken along lines 1B—1B of FIG. 1A;

FIG. 1C is a view aken along lines 1C—1C of FIG. 1A;

FIG. 2A is a schematic illustration of a typical prior art projection system for projecting right reading images directly onto a backlighted screen;

FIG. 2B is a view taken along lines 2B—2B of FIG. 2A;

FIG. 2C is a view taken along lines 2C—2C of FIG. 2A;

FIG. 2D is a view taken along lines 2D—2D of FIG. 2A;

FIG. 3A is a schematic illustration of the projection system of the present invention for projecting right reading images directly onto a backlighted screen;

FIG. 3B is a view taken along lines 3B—3B of FIG. 3A;

FIG. 3C is a view taken along lines 3C—3C of FIG. 3A;

FIG. 4 is a sectional view of a specific embodiment of the projection system of the present invention;

FIG. 5 is a view taken along lines 5—5 of FIG. 4.

The following detailed description of the present invention will refer to the projector and projection system of the present invention as it is used in a motion picture entertainment system specially designed for use in passenger enclosures such as the cabins of commercial aircraft. In a recently developed system for presenting entertainment to the passengers in aircraft, a series of projectors are located at spaced intervals within the passenger enclosure and are interconnected by means of a film guide or tubing through which a motion picture film is passed. Film from a supply station is extracted from the supply reels and advances serially through the guide to each of the projectors and subsequently returns to a take-up reel at the supply station.

For a better understanding of the projection system of the present invention, a typical front and back lighted projection system is illustrated in FIGS. 1A, 1B, 1C and FIGS. 2A, 2B, 2C and 2D. In the frontlighted system as shown in FIG. 1A, a projector assembly 10 comprising a projection light source 12 and a projection lens 14 is located on the same side of a frontlighted projection screen 16 as a viewer 18. A portion of film path 20 through the projector is shown in FIG. 1A together wtih its relation to a light gating mechanism 22 and a film drive apparatus 24. As shown in FIG. 1A, the film in film path 20 has a side 26 adjacent the light gating mechanism and a side 28 opposite the light gating mechanism. As further illustrated in this figure, the light source 12 is on the side of the film path opposite the gating mechanism and the projection lens 14 is on the side of the film path adjacent the mechanism. FIGS. 1B and 1C illustrate the image presented to the viewer's eye when the projection screen and the film are viewed along lines 1B—1B and 1C—1C respectively, of FIG. 1A.

In order to obtain a right reading image on the projection screen, as shown in FIG. 1B, the motion picture film is threaded through the projector such that each film frame is upside down and backwards. This is due to the fact that the normal projection lens rotates the image on a motion picture film through an angle of 180°. Sprocket holes 30 are disposed along the right-hand edge of the film strip and are engaged by teeth on sprockets in the film drive 24.

A typical backlighted projection system is illustrated in FIGS. 2A, 2B, 2C and 2D. In this system a motion picture projector assembly 32 is located on the side of a backlighted translucent projection screen 34 opposite the location of a viewer 36. The relationship of the projection light source 38, projection lens 39, light gating mechanism 42 and film path 43 is the same as that shown in FIG. 1A. The system of this projection arrangement, however, differs from the frontlighted system of FIG. 1A in that a reflective surface 47 is interposed in the optical path between the projection lens and the translucent projection screen 34 in order to obtain the proper handing of the image on the screen as viewed by viewer 36.

As shown in FIG. 2C, a film strip 60 is driven through the motion picture projector assembly in the same manner as the strip shown in FIG. 1C. The images shown in each frame are again upsidedown and backwards and the sprocket holes 62 are located along the right-hand edge of the strip when viewed along lines 2C–2C of FIG. 2A.

The purpose of the interposition of reflective surface 47 can best be illustrated by reference to FIGS. 2B and 2D. If reflective surface 47 were translucent and a viewer stationed on the side of the surface opposite projection apparatus 32, the image seen by this viewer would be shown in FIG. 2D and would be an inaccurate presentation in that the handing of the images on the film would be reverser, i.e., the images which should appear along the right-hand side of the film frame would be shown at the left and likewise images that should be shown at the left would be shown at the right. In order to reverse the handing to provide a right reading image to viewer 36, reflective surface 47 is interposed and an image of proper handing, as shown in FIG. 2B, is presented on the translucent screen 34.

The projection system of the present invention is illustrated in FIGS. 3A, 3B and 3C. This system relates to the presentation of backlighted projections. As shown in FIG. 3A, projection apparatus 64 is located on the side of a translucent projection screen 66 opposite the location of a viewer 68. The projection apparatus of this system differs from that illustrated in FIGS. 1A and 2A in that the location of a projection light source 70 and projection lens 72 are now reversed relative to a light gating mechanism 74 and film drive mechanism 76. As shown in FIG. 3A, source 70 is now on the side of the film path adjacent the gating mechanism and lens 72 is now on the side of the path opposite the gating mechanism. As shown in FIG. 3C, a film strip 78 is driven through the projection apparatus in the same manner as it was driven through the apparatus of FIGS. 1A and 2A. The sprocket holes 80 on the strip are located along the right-hand side of the strip as viewed along 3C—3C and the images in each of the film frames is upsidedown and backwards. By the reversal of the physical location of the projection light source and projection lens within a conventional motion picture projector, the image presented to the viewer 68 is a correctly oriented, right-reading image as shown in FIG. 2B. Were the image projected by apparatus 64 to be viewed from the same side of screen 66, as that on which the projector apparatus is located, the image would have a reverse handing and would be similar to the image illustrated in FIG. 2D. Because the viewer is located on the opposite side of the translucent screen 66, the image presented to his eye has the correct handing, i.e., it has the correct right-left relationship as he would see it if he were actually viewing the image rather than a photographic reproduction of it.

The projector and system illustrated in FIG. 4 is a specific embodiment (suited for use in a passage airplane) of the schematically ilustrated system of FIG. 3A. A light source 44 is now physically located on the side of the film path adjacent a light gating mechanism 45, i.e., on the rear or normally non-illuminated side of the film. Similarly, the physical position of projection lens 46 is also reversed, it is now located on the side of the film path opposite the light gating mechanism, i.e., on the front or normaly illuminated side of the film. As shown, a film strip 48 passes through film guide 50, enters the film transfer mechanism of projector 52 and traces a film path 49 between the source of illumination 44 and the projector lens 46.

In the film transfer mechanism the film passes around a first sprocket wheel 54 located adjacent the entrance to the projector and a second sprocket 56 located adjacent the exit from the projector. Upon emerging from the projector, the film passes through a film looper 58 and re-enters the film guide to pass to the next projection station in the system.

As shown in FIG. 5, a view taken along lines 5—5 of FIG. 4, the film is oriented in the same manner as in FIGS. 1C, 2C and 3C with the sprocket holes 40 disposed along the right side of the film strip and the image inverted in the manner in which film is introduced into a standard motion picture projector. Likewise, sprocket wheels 54 and 56 are provided along the right side of the wheel when the film is viewed in the direction of lines 5—5 of FIG. 4. An aperture 57 is provided in the rear of projector 52 and the projector is oriented such that the aperture is located on the side thereof adjacent translucent screen 59 suitable for displaying a backlighted presentation. From the viewer's position facing the non-illuminated side of backlighted screen 59 the film sprocket holes and sprocket wheel teeth are located along the right-hand side of the viewing path.

By virtue of the reversal of the physical position of the light source 44 and projection lens 46 relative to the film and film path and the provision of an aperture 57 in the rear of the projector 52, a right reading image can be projected on a backlighted screen 59 without the interposition of any optical or reflective means in the path between the projector lens 46 and the screen 59. By elimination of intermediate optical elements in the projection path, the image produced on screen 59 is one of exceptional brightness and resolution.

As the preceding discussion illustrates, the present invention discloses a method of converting a standard motion picture projector and projection system into one for use in presenting backlighted screen projections without alteration of the mechanical film drive provided with the projector in any respect. The modification is easily accomplished by physically reversing the position of the light source and projector lens relative to the conventionally illuminated and non-illuminated sides of a film strip passed through the motion picture projector and projecting an image through the rear of the projector. Specific types of light source, e.g., quartz-iodine sources, are well suited for use in the present invention because of their size and high intensity.

What is claimed is:

1. A method of projecting images recorded on a motion picture film onto a backlighted screen with a conventional motion picture projector apparatus including a light gating mechanism, a film path through the projector having a side adjacent the gating mechanism and a side opposite the gating mechanism, a projection light source and a projection lens comprising the steps of:
   locating the projection lamp on the normally non-illuminated side of the film adjacent the gating mechanism and locating the projection lens on the side of the film path opposite the gating mechanism;
   threading film into the projector along the film path in an orientation for providing a conventional front-lighted screen projection and projecting information recorded on the film from the rear of the projector and directly onto the backlighted projection screen.

2. The method of claim 1 including the step of operatively engaging the projector film transfer mechanism and the film along the edge of the film located adjacent the right-hand side of the viewing path.

3. A method of projecting a right reading image of information recorded on a motion picture film having a normally illuminated side and a normally non-illuminated side onto a backlighted screen comprising the steps of:
   moving film along a film path through a conventional motion picture projector apparatus;
   illuminating said film from the normally non-illuminated side with a light source of a predetermined intensity;
   gathering illuminations passed through said film and projecting said illuminations toward an aperture provided in the rear of the projector; and
   interposing a backlighted projection screen directly into the path of the illumination emerging from the projector aperture to display the images recorded on the film to a viewer located along a viewing path on the non-illuminated side of the projection screen.

4. The method of claim 3 wherein the step of moving the film along the film path includes the steps of:
   providing a sprocket wheel drive for the projector; and
   engaging the film with the sprocket wheel drive at sprocket holes provided along the edge of the film adjacent the right-hand side of the viewing path to drive the film through the projector and direct it along the film path.

5. A motion picture projector comprising:
   a gating mechanism for passing light from a source through a motion picture film frame;
   a film path past the gating mechanism, the film path having a side adjacent the gating mechanism and a side opposite the gating mechanism;
   a projection light source located on the normally non-illuminated side of the film path adjacent the mechanism; and
   a projection lens located on the side of the film path opposite the mechanism for receiving and transmitting illumination from the source directly to a backlighted screen to be illuminated.

6. A motion picture projector according to claim 5 including a supply of motion picture film having a side normally adjacent the gating mechanism and a side normally opposite the gating mechanism located in the projector film path, the film being arranged such that the side of the film normally opposite the gating mechanism is disposed adjacent the projection lens.

7. A motion picture projector according to claim 6 wherein the film is provided with sprocket holes along the right-hand edge of the film side normally opposite the gating mechanism and including a film transfer mechanism utilizing a sprocket drive wheel having teeth along the edge thereof corresponding to the sprocket hole edge of the film.

8. A projector according to claim 7 including a housing for the gating mechanism, film path, light source and projection lens and means for passing illumination emanating from the projection lens through the housing to the backlighted screen.

9. A motion picture projection system comprising:
a backlighted projection screen having an illuminated side and a viewing side;
a projector housing located on the illuminated side of the screen;
a film path through the housing, the film path having a normally illuminated and a normally non-illuminated side;
a source of illumination located within the housing adjacent the normally non-illuminated side of the film path;
a projection lens located within the housing adjacent the normally illuminated side of the film path; and
aperture means in said housing to permit illumination to pass from the projection means directly onto the illuminated side of the projection screen without the interposition of reflective or optical means in the path of illumination from the projection means to the illuminated side of the projection screen.

10. A motion picture projector according to claim 9 including a supply of motion picture film having a normally illuminated side and a normally non-illuminated side located in the projector film path, the film being arranged such that the normally illuminated side of the film is disposed adjacent the normally non-illuminated side of the film path.

11. A motion picture projector according to claim 10 wherein the film is provided with sprocket holes along the right-hand edge of the normally illuminated side of the film and the film transfer mechanism utilizes a sprocket drive wheel having teeth along the edge thereof corresponding to the sprocket hole edge of the film.

12. A method of projecting a right reading image of information recorded on a motion picture film having a normally illuminated side and a normally non-illuminated side onto a projection surface comprising the steps of: moving film along a film path through conventional motion picture projector apparatus; illuminating said film from the normally non-illuminated side with a light source of a predetermined intensity; gathering illuminations passed through said film and projecting said illuminations toward an aperture provided in the rear of the projector; and interposing the projection surface into the path of the illuminations from the projector aperture to display the images recorded on the film to a viewer.

13. A motion picture projection system comprising: a projection surface; a motion picture film projector housing located in a film image projecting postion relative to the projection surface; a projector film path through the housing, the film path having a normally illuminated and a normally non-illuminated side; a source of illumination located within the housing adjacent the normally non-illuminated side of the film path; a projection lens attached to the housing adjacent the normally illuminated side of the film path; and aperture means in said housing to permit illumination to pass from the projection lens onto the projection surface.

References Cited
UNITED STATES PATENTS

| 3,175,460 | 3/1965 | Honick | 353—12 |
| 3,208,336 | 9/1965 | Vago | 353—12 |

FOREIGN PATENTS

| 23,138 | 10/1930 | Australia | 352—104 |

JOHN M. HORAN, Primary Examiner

R. A. WINTERCORN, Assistant Examiner

U.S. Cl. X.R.
350—117; 352—104; 353—12,79